CAMERA APPARATUS FOR RECORDING MOTION PICTURES

Filed Jan. 21, 1964 2 Sheets-Sheet 1

INVENTORS
Maurice Levy
BY Stanislaw A. Policht
Jerome Bauer
ATTORNEY

INVENTORS
Maurice Levy
BY Stanislaw A. Policht
Jerome Bauer
ATTORNEY 3,279,310

CAMERA APPARATUS FOR RECORDING MOTION PICTURES

Maurice Levy, West Englewood, and Stanislaw A. Policht, Closter, N.J., assignors, by mesne assignments, to Berkey Photo, Inc., New York, N.Y., a corporation of Delaware Filed Jan. 21, 1964, Ser. No. 339,165
54 Claims. (Cl. 88—24)

Figure 1:
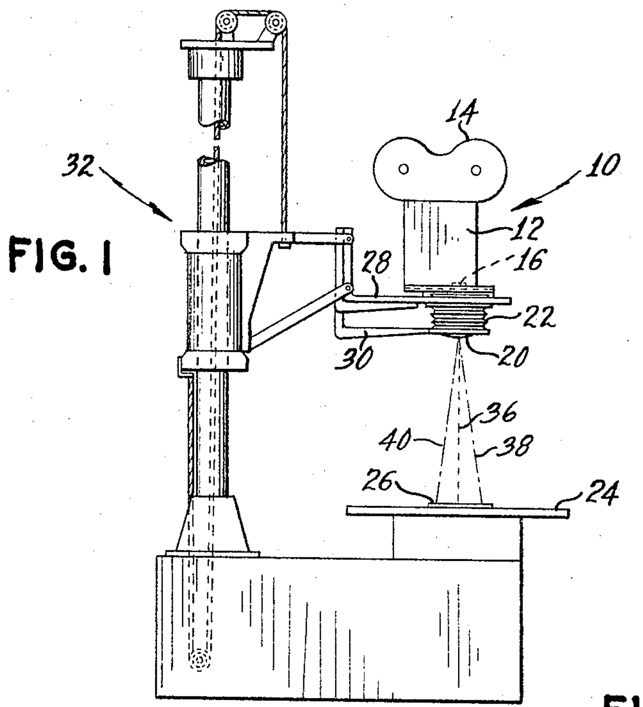

This invention relates to the art of making or recording motion pictures and, in particular, it relates to a method and camera apparatus therefor.

In the television and motion picture industries, the term "motion pictures" is often used interchangeably to refer to the recording or making or sequences of pictures on a moving recording medium. Such medium may be film or tape. Such pictures may be of inanimate objects or they can be animated involving live action to form cartoons or commercial advertisements. In the making of motion pictures, it is often necessary to take a series of recordings of an object that is to be moved from one point to another relative to the aperture. This process is normally accomplished by moving the object from its starting point to its ending point intermittently, step by step, in an interrupted succession of movements. Each time the object is placed in or moved to a new position along its path of movement from the starting to the ending point, the camera is operated to record or take a series of pictures.

During this procedure, it is oftentimes necessary to gyrate the camera or cause it to perform compound movements in numerous directions, sometimes at angles toward or away from the object. Thus, it is not uncommon for the camera to perform unusual maneuvers as the object is also moved in a coordinated planned sequence to different positions. Because of the complex planning and coordinated movements required to be performed by both the camera and the object, a seemingly simple motion picture of relatively short duration may have, in fact, necessitated many retakes of sequences, incurring numerous errors, and requiring tedious hours of stripping, arranging and splicing of sequences of pictures before the whole is completed. This results in an expensive, time consuming production.

The desideratum of this invention is to provide a method of making or recording motion pictures that eliminates the great expense, the long consumption of time and obviates the error-filled processes heretofore required to make motion pictures, and to provide a unique camera for the performance of the method as well as the universal use thereof for standard recording techniques known heretofore.

In the past, when an object was positioned away or offset from the axis of the camera lens or from the local center of the stage with which the axis of the lens was aligned, as the camera lens was moved toward or away from the stage, the object would naturally fade out of or into the field of view of the lens. Prior to this invention, it was not possible to retain the object in the field of view of the lens without interrupting the operation of the camera or causing it to move in compound directions and stopping the camera and moving the object continually back into the field of view of the lens. Hence, it is another object of this invention to provide a novel method of recording motion pictures that will enable the use of a stationary camera to record motion pictures of a stationary object that will retain its proportionate and corresponding position with respect to the stage or background without the need to move the camera or object to retain it in the field of view of the moving lens.

Still another object of the invention is to provide a novel method of recording motion pictures of an object that can be positioned stationary or fixed with respect to a stage and still, almost magically, make the object seem to move relative to the aperture; although all of this to be accomplished without altering the position of the stage or the position of the camera.

Still another object of the invention is to provide a camera apparatus that is completely versatile; that may be used to record pictures by the same processes as have been utilized heretofore; that may be utilized also to enable the recording of an object according to the teaching of this invention so as to make the object seem to move relative to a field of view even while the object is, in fact, stationary with respect to the stage; that can also be utilized as taught by this invention to retain the object in its proportionate and corresponding fixed position offset with respect to the center of the aperture or center of the field of view without movement of either the object, the stage or the camera.

Another object and feature of the invention resides in the provision of a camera having the unique combination of a movable lens and a movable aperture.

To enable a fuller understanding of this invention and its unusual teaching and aspects, the term "lens" is intended to include any type of lens construction used for forming an image of an object by changing the direction of the rays of light from the object along the axis or central ray of the lens and capable of having a variable field of view. Constant focus and zoom type lens systems are encompassed within the definition of the term "lens." These systems are well suited for use in camera recordings of motion pictures and the use of the same shall be deemed to fall within the scope of this invention.

The recording camera apparatus is intended to include motion picture cameras having a recording medium of intermittently moving film strip or wherein a recording tape or the like is used such as in television cameras. The term "object" may be any animate or inanimate subject that is to be recorded. The surrounding scene or background will be referred to hereinafter as the "stage."

Figure 2:
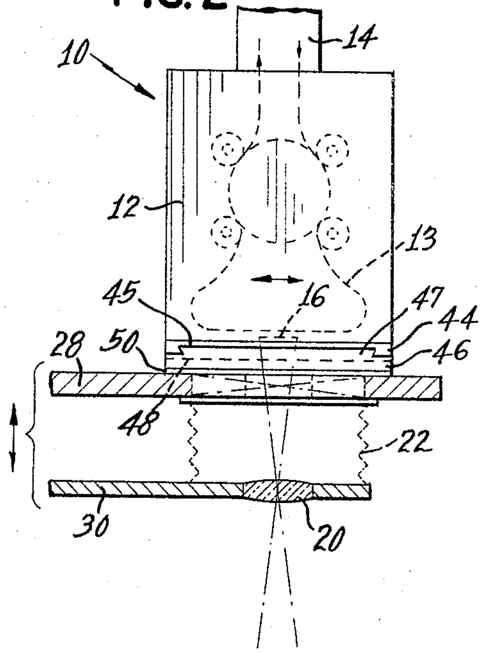
Figure 3:
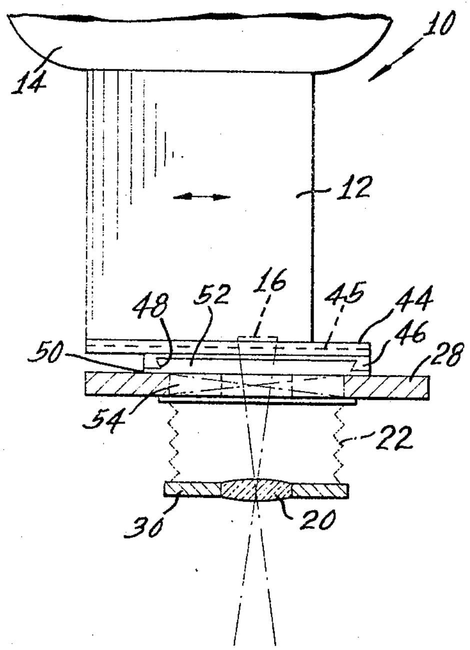
Figure 4:
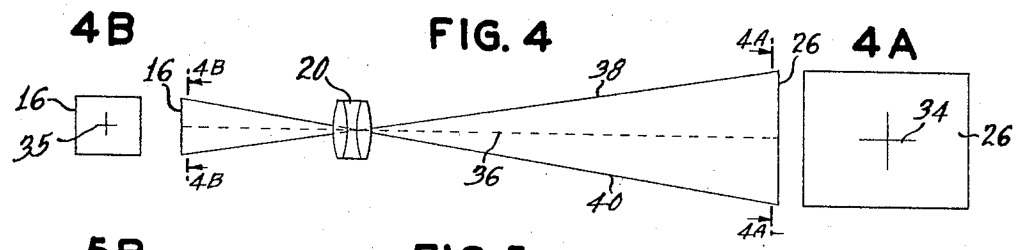
Figure 5:
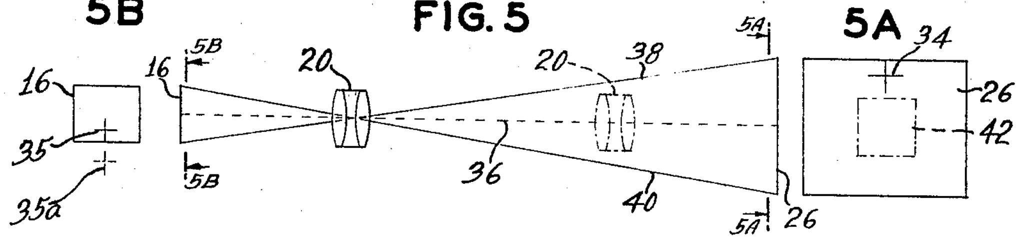
Figures 6, 7:
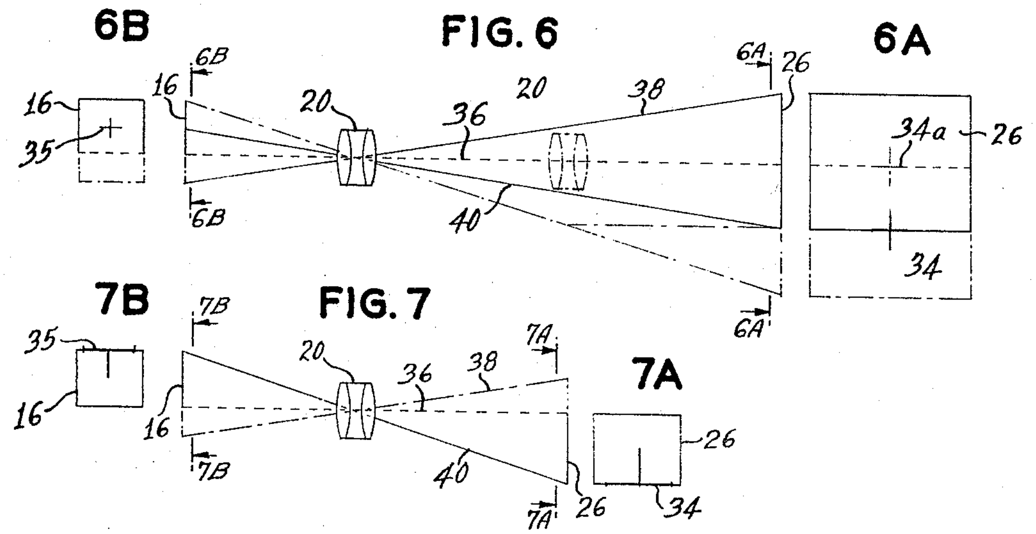
Figures 8, 9:
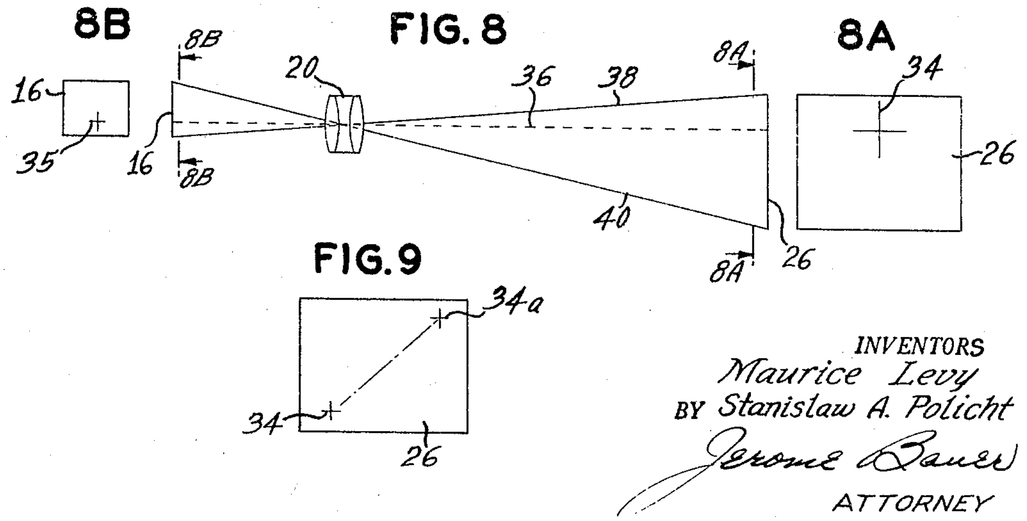

Other and further objects of this invention reside in the structures and arrangements hereinafter more fully described with reference to the accompanying drawings in which:

FIG. 1 is a side view of a conventional system for supporting a camera apparatus that is constructed according to the teaching of the invention, FIG. 2 is an enlarged right-hand side view of a portion of the camera of FIG. 1, FIG. 3 is an enlarged partial view of FIG. 1, FIG. 4 is a diagrammatic view of the lens and the aperture of the camera of FIG. 1, the stage and the object is illustrated in FIG. 4A looking in the direction of lines 4A—4A of FIG. 4, while FIG. 4B is a view of FIG. 4 looking in the direction of lines 4B—4B and illustrating the aperture, FIG. 5 is a diagrammatic view illustrating a camera procedure according to the prior art. FIGS. 5A and 5B are views similar to FIGS. 4A and 4B respectively, FIGS. 6, 6A, and 6B are diagrammatic views similar to FIGS. 4, 4A and 4B respectively and illustrate one method of use and operation of the present invention, FIGS. 7, 7A, and 7B diagrammatically illustrate the result obtained by the apparatus of FIGS. 6, 6A and 6B, FIGS. 8, 8A, and 8B are diagrammatic views illustrating the apparatus and another method of its use, and FIG. 9 is a diagrammatic view of a stage illustrating still a further method of use of the instant apparatus.

Referring now to the drawings and, in particular, to FIGS. 1, 2 and 3, there is shown a camera apparatus generally identified by the numeral 10. The camera apparatus 10 comprises a housing 12 having a recording medium as film 13 in a magazine 14. The precise details of the camera housing 12, its recording medium 13 and magazine 14 may be of any well known construction and are shown only to enable a clearer understanding of the working of the inventive details of the camera and methods to be described.

As is usual with cameras for recording motion pictures, the camera 10 is provided with an aperture 16 through which light rays are adapted to pass and be admitted to recording medium 13 shown in FIG. 2. Also forming a part of the camera 10 is the lens 20 that may have the characteristics previously mentioned. The lens 20 is secured to the camera as an integral part thereof and is light-tightly associated with the aperture 16 by an expansible bellows 22.

In the usual arrangement for the taking or recording of motion pictures, the lens 20 is adapted to move toward and away from a table 24. The table 24 is adapted to support background material to be photographed, such material being referred to hereafter as the stage and shown in FIG. 1 by the numeral 26. During the taking or recording of motion pictures, the lens 20 can be moved toward or away from the stage 26 to produce an enlargement or reduction in the size of an image of objects on or forming parts of the stage. In practice, the camera 10 is supported on an arm 28. The lens 20 is movable toward and away from the stage 26 and the objects thereon by the vertical movement of an arm 30. The arms 28 and 30 are operated through mechanisms (not numbered) included in an upright support structure generally identified by the numeral 32, the additional details of which form no part of this invention, but which are illustrated in FIG. 1 of the drawing to enable a clearer understanding of the simplicity of the invention.

Reference is now made to the illustration of FIG. 4 and its associated views of FIGS. 4A and 4B. These are intended to portray a standard or conventional camera apparatus for photographing or recording an object 34 on a recording medium, such as the film strip 13. The rectangular box shown in FIG. 4A is intended to depict that portion of the stage 26 that is within the field of view of the lens 20. The crossed lines shown on the stage 26 is the object 34 fixed in position with respect to the stage. FIG. 4B is a view looking toward the left-hand side of FIG. 4 and illustrates the defining wall of the camera light aperture 16 and the image 35 formed thereat by the light rays emanating from the object 34, the stage 26, and passing through the lens 20. The central dash line of FIG. 4 depicts the imaginary axis or the central ray 36 of the lens 20 whereas the converging and diverging lines 38 and 40 depict the light rays that form the outer limits of the field of view of the lens 20.

In practice, as the lens 20 is moved gradually along the length of its central ray or axis 36 toward the stage 26 and the object 34 positioned thereon, the field of view of the lens gradually narrows with the lines 38 and 40 moving closer toward each other, thereby causing an enlargement of the image 35 at the aperture 16. If the object 34 is positioned with the center of its crossed lines located in alignment with the axis 36 of the lens 20, and the aperture 16 is also positioned with respect to the axis 36 of the lens 20 such that the image 35 formed thereat similarly has the center of its crossing lines at the center of the aperture and in axial alignment with the axis 36, the zooming or movement of the lens 20 toward and away from the object 34 will merely result in an enlargement or reduction of the image 35 at the aperture.

Referring now to FIG. 5, it will be seen that if the object 34 is positioned away or offset from the focal center of the stage 26, it is also positioned out of alignment with the axis or central ray 36 of the lens 20. At such time, the resultant image 35 formed by the lens 20 at the aperture 16 is located at a point in the aperture corresponding to but proportionately reverse from that of the location of the image 35 with respect to the stage 26.

In such cases, and according to prior art practices, when the focal point of the lens 20 was moved closer to the stage 26 to create an enlargement of objects 34 contained thereon, the field of view of the lens 20 reduced in size, since the lines 38 and 40 moved toward each other. Thus, as the lens 20 moved along its axis 36 toward the stage 26 to its dash-line position and until its outer limits 38 and 40 achieved a field of view as depicted by the dash lines 42 in FIG. 5A, the object 34 gradually faded from view and was completely removed from the field of view of the lens 20. Thus, it was no longer visible in the aperture 16 because its image 35a would assume the dash-line position in FIG. 5B.

Yet, during the recording of motion pictures of the stage 26, it may have been necessary to have the object 34 remain within the field of view of the lens 20 during such zooming movement of the lens toward the stage 26. In such cases and in accordance with the teaching of the prior art, it was necessary for the camera operator to perform compound movements of the camera and its associated structure relative and about the stage 26. These compound panning movements created many problems. They had to be accomplished smoothly and at regular, but carefully planned intervals, all of which resulted in an extremely great consumption of time, effort, the exercise of much skill and ingenuity, and sometimes requiring many retakes.

The present invention overcomes these problems. Referring to FIG. 8, there is shown the same relative arrangement of the object 34 positioned offset or away from the focal center of the stage 26. Under prior art described practices of FIGS. 5, 5A and 5B, if the object 34 were to remain within the field of view of the lens 20, it was necessary to perform the compound panning movements described. In accordance with the present invention, it is now possible to retain the object 34 within the field of view of the lens 20 even while the lens is moved closer to the stage 26 without moving either the object or the camera once they are properly positioned. It is now possible to record the object 34 in its corresponding proportionate position with respect to the stage 26 while at the same time enlarging or reducing the image 35 of the object and the overall stage created at the aperture 16 of FIG. 8B.

To accomplish this, the object 34 is positioned stationarily or fixed in its desired location relative to the stage 26. The center of the cross lines of the object 34 is then selectively positioned such that it and the axis or central ray 36 of the lens 20 are in alignment with each other. The aperture 16 is then selectively moved such that the image 35 formed thereat by the rays of light passing through the lens 20 is located in a position with respect thereto that corresponds to the proportionate position, but on the reverse side thereof from the position object 34 has with respect to the stage 26. Now, while the camera 10 is operating, as the lens 20 moves toward the stage 26 and the object 34 thereon, it also moves along the length of its axis or central ray 36 that is aligned with the center of the object 34. Since the central ray or axis 36 of lens 20 is focused on the center of the object 34, the selectively offset reverse corresponding positioning of the aperture 16 compensates for the zooming, narrowing field of view movement of the lens.

During the forward or zooming movement of the lens toward the object 34, the image 35 formed at the aperture 16 of the object 34 retains its same reverse but proportionate and corresponding relative position with respect to the remainder of the stage 26. Because the lens axis 36 is aligned with the object 34, the selective positioning of the aperture 16 enables the selective control and admission of only certain desired ones or portions of the light rays to the recording medium 13. The object 34 does not fade out of or beyond the field of view of the lens 20 as in the prior art as illustrated in FIGS. 5, 5A and 5B. Therefore, the present method and camera apparatus 10 eliminates the need to execute compound panning movements of the camera relative to the object and stage, or to move the object successively relative to the stage while stopping to readjust the location of the camera. As a result of this method and camera apparatus 10, the object remains in its same relative location in the field of view of the lens 20 as it initially assumed when positioned stationary with respect to the stage 26, despite the movement of the lens 20 toward or away from the same.

The present invention also permits the camera apparatus 10 to create and record by motion pictures, the seeming movement of the object 34 relative to the aperture 16, even while the object is, in fact, fixed in position or stationary relative to the stage during the recording operation with a stationary camera 10 but a zooming or moving lens 20. This feat is accomplished in the manner shown in FIGS. 6, 6A and 6B. The result thereof is diagrammatically illustrated in FIGS. 7, 7A and 7B respectively.

Referring now to FIGS. 6, 6A and 6B, the solid lines in FIG. 6A depict the actual location of the stage 26. The stage 26 is initially positioned on the table 24 so its center or focal center is located in axial alignment with the axis 36 of the lens 20. This permits the full area of stage 26 that is desired to be recorded by the camera 10 to be subject to the full field of view of the lens 20, as depicted by the full lines 38 and 40. It is possible to portray the seeming movement of the object 34 from any position of the aperture 16 to any other position in such aperture or with respect to such aperture without the necessity of actually moving the object and without causing the camera to perform compound movements.

To record this seeming movement of the stationary object 34 from its seeming starting point of movement with respect to the aperture 16 to its seeming ending point of movement with respect to the same aperture, the stage 26 (full lines FIG. 6A) is adjusted on the table 24 so its center or focal center **34*a* is in alignment with the axis 36 of the lens 20. The terms center or focal center of the stage is employed herein to denote that part of the stage that will be the point at which the lens will focus during the time it is moved toward the stage and finally reaches its end point of movement closer to the stage. The lens 20 is now moved to its end point of movement as shown in dash lines in FIG. 6. At this point, its field of view of the stage 26 (full lines FIG. 6A) is narrowest. Now the object 34 is positioned at its seeming end point of movement relative to the axis 36 of the lens and relative to the focal center of the stage 26. This position of the object 34** is illustrated by the full lines of FIG. 6A.

The lens 20 is now moved back from its dash line ending point to its full line starting position (FIG. 6). The aperture 16 is then selectively moved relative to the axis of the lens 20 so as to position the image 35 formed thereat such that the object 34 appears to be in its desired starting position relative to the stage 26. The location of the aperture is shown in FIGS. 6 and 6B and identified by the numeral 16. This selective positioning of the aperture 16 serves to selectively mask out light rays or portions thereof to prevent their admission to the recording medium 13.

Now as the camera 10 operates to record motion pictures, the lens 20 is zoomed or moved along the length of its axis 36 toward the stage 26. As its field of view narrows, the objects whose light rays pass through it are enlarged to form an enlarged image at the aperture 16. As the lens 20 continues to move toward its dash line position in FIG. 6, its axis 36 remains fixed with respect to the starting position of the object **34*a* on the stage 26 (full lines FIG. 6A) and aligned therewith. However, during the movement of the lens 20 toward its end point (dash lines FIG. 6), the image 35 formed at the center of the aperture 16, which is the imaginary starting point 34*a* of the object 34, the image seems to move within the aperture 16** from the starting point (FIG. 6B) to the ending point as shown in FIG. 7B.

This apparent movement of the image 35 of the object 34 from its starting position in FIG. 6B ends in the position illustrated in FIG. 7B. The initial offset relation of the aperture 16 relative to the axis 36 selectively admits to the recording medium 13 of the camera 10 only those of the light rays of the stage 26 desired to record the object 34 as though it were in its starting position **34*a*. But, as the field of view of the zooming lens 20 is narrowed and the image 35 becomes enlarged, its enlargement at the aperture makes it appear as though the stationary object 34 actually moves from the starting point 34*a* to the ending point 34. This result is more fully illustrated respectively by FIGS. 7, 7A and 7B wherein the lens 20 in FIG. 7 shows the light rays passing through the lens 20 when it is in its dash line ending position of FIG. 6. Thus, it is possible to make a stationary object 34 appear to move from a starting position 34*a* to an ending position 34 without the necessity of moving either the camera or the object 34** once they were in position according to the invention.

This ability to retain an object 34 in its proportionate and corresponding position with respect to its aperture 16 as described in relationship to FIGS. 8, 8A and 8B or to produce an apparent or seeming movement of a stationary object from one position to another relative to its aperture is facilitated by providing the camera apparatus 10 an almost unbelievably simple, yet unique arrangement of structure. In the present invention, the camera housing 12, including the aperture 16, is mounted on a compound dovetail structure more clearly shown in FIGS. 1, 2 and 3.

Thus, if the method teaching of FIGS. 6 and 7 is utifemale dovetail 45 formed therein. A second plate 46 has a mating male dovetail 47 extending upward into and cooperating with the female dovetail of the plate 44, but also has an interior or female dovetail 48. A third plate 50 is provided with an upwardly projecting male dovetail 52 that extends into and for mating engagement with the interior dovetail 48 on the plate 46. The dovetails of the plate 44 and plate 50 are planar in relationship, but directed perpendicularly with respect to each other.

Thus, the dovetail engagement between the plates 44 and 46 permits movement of the aperture 16 in one planar direction. The dovetail engagement between the plates 50 and 46 permits the planar movement of the aperture 16 in a direction offset 90° with respect to that of the plates 44 and 46. The whole of the compound dovetail structure 44, 46 and 50 is mounted on the arm 28 and connectedly seated on and for rotation with a rotatable plate 54 retained in the arm. Hence, the camera housing 12 and its aperture 16 is capable of performing planar movements, not only in compound directions relative to the axis 36 of the lens 20, but also rotatively about a vertical axis passing through the aperture 16 by virtue of the rotatability of the plate 54.

Thus, if the method teaching of FIGS. 6 and 7 is utilized, the aperture 16 can be rotated by the plate 54 to cause the seeming movement of an object 34 positioned stationary with respect to a frame 26 as shown in FIG. 9 such that the object 34 would seem to move diagonally from a starting position **34*a*. This apparent diagonal movement of a stationary object is facilitated by the ability to rotate the aperture 16 by reason of the plate 54 and also to offset the location of such aperture with respect to the axis or central ray 36 of the lens 20** in the manner as described in the discussion of the use of the invention illustrated in FIGS. 6 and 7.

Those skilled in the art of motion picture recording will readily realize that the present camera apparatus 10 can be operated with greater versatility than merely performing the processes previously described. The ability to enable or permit the movement of the aperture 16 relative to the lens axis 36 also serves to allow the camera apparatus 10 to perform in the same manner as prior art cameras. For example, by positioning the aperture 16 centrally aligned with the lens axis 36, the camera apparatus can operate in accordance with prior art procedures as shown in and as described with respect to FIGS. 4, 4A and 4B or as in FIGS. 5, 5A and 5B.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

We claim:

1. In a camera for recording motion pictures, the combination, within said camera, comprising image recording means for recording an object and showing movement of said object, lens means for forming an image of said object including means changing the direction of the rays of light from said object along the axis of said lens means and capable of having a variable field of view, and an aperture-containing means having an aperture therethrough, said aperture-containing means including said aperture being movable with respect to said image recording means and said lens means, said lens means being movable, said aperture-containing means including said aperture being movable within said camera relative to said lens means.

2. The apparatus of claim 1 wherein said aperture-containing means is movable between said image recording means and said lens means.

3. The apparatus of claim 1 including means on said camera cooperable with said aperture-containing means including said aperture for permitting movement of said aperture-containing means including said aperture to a preselected position and means for moving said lens means in the direction of its axis relative to said aperture.

4. The apparatus of claim 1 wherein said lens means is movable in the direction of its axis and said aperture is alignable with said axis of said lens means, and said aperture and said lens means are movably displaceable relative to each other.

5. The apparatus of claim 1 including means for enabling movements of said aperture-containing means including said aperture and of said lens means.

6. The apparatus of claim 1 including means for enabling the movement of said aperture-containing means including said aperture in a plurality of directions, said means being connected with said aperture-containing means.

7. The apparatus of claim 1 including means for enabling rotary movement of said aperture-containing means including said aperture, said means being connected with said aperture-containing means.

8. The apparatus of claim 1 wherein said aperture-containing means including said aperture is defined in a plane substantially normal to the axis of said lens means.

9. The apparatus of claim 1 including means connecting said lens means and said aperture-containing means for enabling movements thereof, said lens means being movable toward and away from said object to form an image thereof of variable size at a location remote therefrom.

10. Apparatus for recording motion pictures of an object comprising, in combination, a camera for recording motion pictures comprising the combination, within said camera, including image recording means for recording an object and showing movement of said object, lens means for forming an image of said object including means changing the direction of the rays of light from said object along the axis of said lens means and capable of having a variable field of view, and an aperture-containing means having an aperture therethrough, said aperture-containing means including said aperture being movable with respect to said image recording means and said lens means, said lens means being movable, said aperture-containing means including said aperture being movable within said camera relative to said lens means, and a stage means for receiving said object thereon in a position fixed with respect thereto, said stage means being spaced from said camera.

11. The apparatus of claim 10 wherein said aperture-containing means is movable between said image recording means and said lens means.

12. The apparatus of claim 10 including means on said camera cooperable with said aperture-containing means including said aperture for permitting movement of said aperture-containing means including said aperture to a preselected position and means for moving said lens means in the direction of said axis relative to said aperture.

13. The apparatus of claim 10 wherein said lens means is movable in the direction of its axis and said aperture is alignable with said axis of said lens means, and said aperture and said lens means are movably displaceable relative to each other.

14. The apparatus of claim 10 including means for enabling movements of said aperture-containing means including said aperture and of said lens means.

15. The apparatus of claim 10 including means for enabling the movement of said aperture-containing means including said aperture in a plurality of directions, said means being connected with said aperture-containing means.

16. The apparatus of claim 10 including means for enabling rotary movement of said aperture-containing means including said aperture, said means being connected with said aperture-containing means.

17. The apparatus of claim 10 wherein said aperture-containing means including said aperture is defined in a plane substantially normal to the axis of said lens means.

18. The apparatus of claim 10 including means connecting said lens means and said aperture-containing means for enabling movements thereof, said lens means being movable toward and away from said object to form an image thereof of variable size at a location remote therefrom.

19. The apparatus of claim 1 wherein said lens means is a constant focus lens system.

20. The apparatus of claim 2 wherein said lens means is a constant focus lens system.

21. The apparatus of claim 3 wherein said lens means is a constant focus lens system.

22. The apparatus of claim 4 wherein said lens means is a constant focus lens system.

23. The apparatus of claim 5 wherein said lens means is a constant focus lens system.

24. The apparatus of claim 6 wherein said lens means is a constant focus lens system.

25. The apparatus of claim 7 wherein said lens means is a constant focus lens system.

26. The apparatus of claim 8 wherein said lens means is a constant focus lens system.

27. The apparatus of claim 9 wherein said lens means is a constant focus lens system.

28. The apparatus of claim 10 wherein said lens means is a constant focus lens system.

29. The apparatus of claim 11 wherein said lens means is a constant focus lens system.

30. The apparatus of claim 12 wherein said lens means is a constant focus lens system.

31. The apparatus of claim 13 wherein said lens means is a constant focus lens system.

32. The apparatus of claim 14 wherein said lens means is a constant focus lens system.

33. The apparatus of claim 15 wherein said lens means is a constant focus lens system.

34. The apparatus of claim 16 wherein said lens means is a constant focus lens system.

35. The apparatus of claim 17 wherein said lens means is a constant focus lens system.

36. The apparatus of claim 18 wherein said lens means is a constant focus lens system.

37. The apparatus of claim 1 wherein said lens means is a zoom type lens system.

38. The apparatus of claim 2 wherein said lens means is a zoom type lens system.

39. The apparatus of claim 3 wherein said lens means is a zoom type lens system.

40. The apparatus of claim 4 wherein said lens means is a zoom type lens system.

41. The apparatus of claim 5 wherein said lens means is a zoom type lens system.

42. The apparatus of claim 6 wherein said lens means is a zoom type lens system.

43. The apparatus of claim 7 wherein said lens means is a zoom type lens system.

44. The apparatus of claim 8 wherein said lens means is a zoom type lens system.

45. The apparatus of claim 9 wherein said lens means is a zoom type lens system.

46. The apparatus of claim 10 wherein said lens means is a zoom type lens system.

47. The apparatus of claim 11 wherein said lens means is a zoom type lens system.

48. The apparatus of claim 12 wherein said lens means is a zoom type lens system.

49. The apparatus of claim 13 wherein said lens means is a zoom type lens system.

50. The apparatus of claim 14 wherein said lens means is a zoom type lens system.

51. The apparatus of claim 15 wherein said lens means is a zoom type lens system.

52. The apparatus of claim 16 wherein said lens means is a zoom type lens system.

53. The apparatus of claim 17 wherein said lens means is a zoom type lens system.

54. The apparatus of claim 18 wherein said lens means is a zoom type lens system.

References Cited by the Examiner

UNITED STATES PATENTS

| | | | |
|---|---|---|---|
| 1,850,641 | 3/1932 | St. Genies | 352—85 |
| 3,183,770 | 5/1965 | Nyman et al. | 88—24 |

NORTON ANSHER, *Primary Examiner.*

R. A. WINTERCORN, *Assistant Examiner.*